United States Patent
Kronseder (10) Patent No.: US 10,532,846 B2
(45) Date of Patent: Jan. 14, 2020

(54) GLUE ROLLER WITH DELIMITED GLUING REGION

(71) Applicant: KRONES AG, Neutraubling (DE)

(72) Inventor: Volker Kronseder, Neutraubling (DE)

(73) Assignee: Krones AG, Neutraubling (DE)

( * ) Notice: Subject to any disclaimer, the term of this patent is extended or adjusted under 35 U.S.C. 154(b) by 65 days.

(21) Appl. No.: 15/738,554

(22) PCT Filed: Apr. 13, 2016

(86) PCT No.: PCT/EP2016/058052
§ 371 (c)(1),
(2) Date: Dec. 20, 2017

(87) PCT Pub. No.: WO2017/001075
PCT Pub. Date: Jan. 5, 2017

(65) Prior Publication Data
US 2018/0170604 A1    Jun. 21, 2018

(30) Foreign Application Priority Data

Jun. 30, 2015  (DE) .................. 10 2015 212 141

(51) Int. Cl.
*B29C 65/00*   (2006.01)
*B65C 9/22*    (2006.01)
(Continued)

(52) U.S. Cl.
CPC ............ *B65C 9/226* (2013.01); *B65C 9/2269* (2013.01); *B29C 65/48* (2013.01); *B29C 65/50* (2013.01);
(Continued)

(58) Field of Classification Search
CPC ....... B29C 65/48; B29C 65/50; B29C 65/524; B29C 65/526
(Continued)

(56) References Cited

U.S. PATENT DOCUMENTS 3,006,317 A   10/1961  Showalter
4,347,095 A   8/1982   Yamashita
(Continued)

FOREIGN PATENT DOCUMENTS

DE    3022040 A1   3/1982
DE    4006837 C1   4/1991
(Continued)

OTHER PUBLICATIONS

ISA European Patent Office, International Search Report Issued in Application No. PCT/EP2016/058052, dated Jul. 4, 2016, WIPO, 6 pages.

*Primary Examiner* — Mark A Osele
*Assistant Examiner* — Nickolas R Harm
(74) *Attorney, Agent, or Firm* — McCoy Russell LLP (57) ABSTRACT

The present invention provides a labelling apparatus for applying labels to containers, comprising a gluing device having a glue roller and a glue-application unit, which is assigned to the glue roller and is intended for applying glue to the glue roller, wherein the glue-application unit has at least one accommodating space for accommodating the glue, and wherein the glue roller and/or the glue-application unit are designed, and arranged in relation to one another, such that glue which is located in the accommodating space is applied to the surface of the glue roller only in one or more sub-regions of the overall extent—as seen in the axial direction of the glue roller—of the surface of the glue roller.

15 Claims, 7 Drawing Sheets

(51) Int. Cl.
   *B65C 9/00* (2006.01)
   *B29C 65/48* (2006.01)
   *B29C 65/52* (2006.01)
   *B29C 65/50* (2006.01)

(52) U.S. Cl.
   CPC .......... *B29C 65/524* (2013.01); *B29C 65/526* (2013.01); *B65C 2009/0075* (2013.01)

(58) Field of Classification Search
   USPC ...................... 156/157, 277, 291, 324.4, 502
   See application file for complete search history.

(56) References Cited

U.S. PATENT DOCUMENTS

| | | | |
|---|---|---|---|
| 4,693,210 A * | 9/1987 | DiFrank | B65C 9/226 |
| | | | 118/231 |
| 5,160,570 A | 11/1992 | Dickey | |
| 5,671,673 A * | 9/1997 | Boose | B41F 31/027 |
| | | | 101/363 |
| 8,962,074 B2 | 2/2015 | Hafner et al. | |
| 2006/0115646 A1* | 6/2006 | Fujiwara | B31D 1/0062 |
| | | | 428/343 |

FOREIGN PATENT DOCUMENTS

| | | |
|---|---|---|
| DE | 29906072 U1 | 7/1999 |
| DE | 20220132 U1 | 4/2004 |
| DE | 102010000182 A1 | 7/2011 |
| DE | 102010022190 A1 | 11/2011 |
| DE | 202013100352 U1 | 4/2014 |
| WO | 2014114678 A1 | 7/2014 |

* cited by examiner

GLUE ROLLER WITH DELIMITED GLUING REGION

CROSS-REFERENCE TO RELATED APPLICATIONS

The present application is a U.S. National Phase of International Patent Application Serial No. PCT/EP2016/058052 entitled "GLUE ROLLER WITH DELIMITED GLUING REGION," filed on Apr. 13, 2016. International Patent Application Serial No. PCT/EP2016/058052 claims priority to German Patent Application No. 10 2015 212 141.0, filed on Jun. 30, 2015. The entire contents of each of the abovementioned applications are hereby incorporated by reference in their entirety for all purposes.

FIELD OF THE INVENTION

The present invention relates to an apparatus and a method for exactly applying glue to labels in a labelling apparatus for containers, in particular for cans, glass bottles, PET bottles, or the like.

BACKGROUND

Labelling machines are used in the beverage processing industry in order to apply continuously labels to consistently fed articles or containers with high performance. Thereby, the containers may be cans, glass bottles, plastic bottles or the like. In addition to self-adhesive labels, also labels are known onto which initially glue is applied in order to subsequently apply the labels provided with glue onto the containers. Appropriate glue, for example, is applied onto the rear sides of the labels via a gluing device by means of a glue roller. This may occur directly by applying the glue by means of the glue roller to the labels passing by means of a vacuum cylinder. However, it may also occur indirectly by initially transferring the glue by means of a glue roller to the curved adhesive surface by extraction elements which are moved past the glue roller in an oscillating or rotating manner, so-called pallets which for their part remove separately the labels from a label stack, whereby during removing, the labels are provided on the rear side with the glue that beforehand has been transferred. The now glued labels are subsequently transferred to a rotating gripper cylinder or the like, from where they are transmitted to the containers.

In both cases, the required glue initially has to be transferred by a storage container for glue to the glue roller. For this, the glue is usually pumped from the storage container to a glue application unit by means of a pump and is applied thereto over the entire axial extent of the glue roller. Document DE 3022040 A1, for example, describes a glue roller to which a glue application element and an adjustable glue scraper are assigned. Thereby, the glue drained from the storage container by means of the glue scraper is transferred to the glue roller. Regularly, the glue scraper is configured pivotedly mounted and abuts tangentially the glue roller in axial direction of the glue roller. The positioning of the glue scraper at the glue roller, thereby, is of great importance for an optimal labelling result. During applying the glue on the glue roller, a so-called glue string is formed extending over the entire height of the glue roller.

SUMMARY

In this embodiment, it is a problem that in the event of an operation stoppage of the labelling machine the glue string remaining at the glue roller may dry out and sometimes may be very difficult to be removed. Furthermore, regarding such a system, there is the risk that due to contacting the ambient air, in particular due to contacting the atmospheric oxygen, the glue changes its chemical structure and/or composition. Furthermore, regarding the known systems, the glue string extends over the entire height, i.e. extent of the glue roller in axial direction so that the applied glue is not assumed in its full surface by the generally smaller label or pallet. The glue which is not assumed, on the other hand, can become touch dry at the glue roller or change its characteristics.

Thus, the objective technical problem of the present invention is to provide a gluing device for a labelling apparatus in which the glue preferably is applied only in the amount actually needed. In addition, it is an object of the present invention that different operation modes of the labelling apparatus as e.g. a labelling mode, a sleep mode, cleaning mode, etc., may be adjusted particularly easily and preferably. Broadly, the objective technical problem of the present invention is to reduce the glue consumption of the labelling apparatus and to prolong its service life.

The above mentioned objective technical problems are solved by a labelling apparatus for applying labels to containers, comprising a gluing device having a glue roller and a glue-application unit which is assigned to the glue roller and is intended for applying glue to the glue roller, wherein the glue application unit has at least one accommodating space for accommodating the glue, and wherein the glue roller and/or the glue-application unit are designed and arranged in relation to one another, such that glue which is located in the accommodating space is applied to the surface of the glue roller only in one or more sub-regions of the overall extent—as seen in the axial direction of the glue roller—of the surface of the glue roller.

The labelling apparatus for applying labels on containers may generally be an arbitrary labelling apparatus known from the prior art comprising a glue roller in order to apply the glue on the labels to be applied as described above directly or indirectly. As mentioned, the containers may be cans, glass bottles, plastic bottles, in particular PET bottles or the like. In particular, one or more of the known elements such as a container feed, a container table, a container removal, an infeed worm, a labelling assembly with one or two label tape rolls, label feed, cutting unit, vacuum roller and vacuum or gripper cylinder or a labelling assembly with a label box, pallet carousel or removal element carriers, corresponding pallets or removal elements including possibly required control curve, and gripper cylinder or the like may be part of the labelling apparatus. The mentioned elements are well known in the prior art and are therefore not described in detail here. In addition, exemplary embodiments of such labelling apparatuses are described in more detail in connection with the Figures.

In addition, the labelling apparatus can be provided as a part of a machine module together with further components, as e.g. a filling machine for filling the containers. A machine module in the meaning of the present invention is to be understood such that at least machines comprised by the machine module for filling, sealing, and labelling are mounted on a joint frame and/or that their frames for the production plant are mechanically immovably connectable with one another, for example by screwing, clamping, or the like. The frames may be composed of several modules, assembly platforms, or the like which may be fixedly connected with one another for individual machines, treatment units and/or transfer star wheels.

Accordingly, a container transfer between the individual machines of the machine module is possible in a space-saving and precise manner by means of transfer star wheels, as for example infeed star wheels and discharge star wheels, worm conveyors, or the like.

Preferably, the machine module may further comprise a stretch blow machine which is configured upstream the filling machine for producing containers made of a plastic, in particular of PET. This allows a particularly compact construction and reduces the risk of contamination of the containers on their way to the filling machine and the subsequent machines of the machine module.

Preferably, upstream the filling machine, the machine block can comprise an inspection unit and/or a rinser for containers made of glass. This allows a specifically compact construction and reduces errors during the transport and/or due to contamination of the containers between the inspection unit, the rinser, and the filling machine. Preferably, the filling machine, the sealing machine, and the labelling machine may be configured as carousel-type machines with a continuous container transport, in particular in this sequence. This allows high machine performances of the machine module.

Preferably, the filling machine, the sealing machine, and the labelling machine may be directly coupled to one another in a conveyor-technical manner by transfer star wheels, as for example, infeed star wheels, discharge star wheels, transport star wheels or the like. In addition, between discharge star wheels and infeed star wheels, there can be provided infeed worms or the like. Preferably, additional machines of the machine module, as for example the stretch blow machine may be coupled in the same conveyor-technical manner.

The labelling apparatus may be modularly constructed such that it is also suitable for labelling with sheet-shaped labels. A modularly designed labelling apparatus is preferable. Thereby, the labelling apparatus can be docked interchangeably and movably by means of rolls at the machine periphery, in particular at the machine carousel on a height-adjustable, ground-based, non-ground-based and/or free-standing accommodating unit.

According to the invention, the gluing device comprises a glue roller which is operated in a principally known manner and thereby accommodating glue from a glue-application unit which is assigned to the glue roller which subsequently is transferred either directly to the labels or initially to the pallets of a pallet carousel. For this purpose, the glue-application unit is arranged at a position of the circumference of the glue roller upstream the labels or the pallets in the circulation of the glue roller. The glue roller has a cylindrical shell surface which is rotated about a rotational axis arranged along the longitudinal axis of the glue roller. The rotation of the glue roller thereby can occur by means of a controllable and/or adjustable drive, for example, in the form of a controllable electric motor. As seen in the axial direction of the glue roller, there is, thus, a maximal extent of the surface, i.e. the shell surface, of the glue roller which may be applied with glue. Generally, this corresponds to the height of the cylindrical part of the glue roller. The terms "surface" and "shell surface" are consciously used here and in the following separately since, as described below, marginal deviations of the surface of the glue roller from the strictly cylindrical shell surface of the glue roller may be provided in order to limit the glue accommodating to well-defined sub-regions.

According to the present invention, the glue-application unit comprises one or more accommodating spaces in the form of hollow chambers for accommodating glue, as this is, for example, the case regarding the below described hollow chamber glue scraper. Thereby, glue is fed to the accommodating space or spaces from a glue storage container by means of one or more transport lines for the glue so that glue can be emitted from the accommodating space or spaces being open at the roller side during operation to the surface of the glue roller. The glue, for example, can be removed from a glue storage container by means of a glue pump and pumped through the transport line to the accommodating space or spaces. This glue supply can in particular occur controllably and/or adjustably depending on the required glue amount, by, for example providing a controllable glue pump.

According to the invention, the glue roller and/or the glue-application unit are designed and arranged in relation to one another such that glue which is located in the at least one accommodating space is applied in one or more sub-regions of the axial extent of the shell surface to the surface of the glue roller or does not accommodate glue. This means that a part of the axial extent of the shell surface is not applied with glue. In particular, this part goes beyond the part which due to the construction, for example, depending on the thickness of the sealing units restricting the accommodating space, as described below, generally cannot be applied with glue. The axial extent of the sub-regions applied with glue is, thus, smaller than the axial extent of the shell surface of the glue roller which can be maximally applied with glue. In particular, the (summed) axial extent of the sub-region or sub-regions applied with glue can be smaller than or equal to 90%, preferably smaller than or equal to 80%, further preferably smaller than or equal to 70% of the height of the shell surface.

Applying glue in only one or more sub-regions in respect to the axial extent of the surface of the glue roller can be realised by an appropriate configuration of the glue roller, for example, by means of the subsequently described contact segments and/or the glue-application unit, for example, by means of the accommodating spaces which are spatially separated and described further below, or a controllable scraper with two or more segments. Thereby, it is conceivable that either the glue roller or the glue-application unit due to their specific configuration limits the glue application to the sub-region/s, whereas the other element respectively would allow a greater glue application with regard to its extent in the axial direction. Thereby, by adapting the configuration, for example, by exchanging, by specifically controlling or adapting the relative arrangement of the glue roller and the glue-application unit, the sub-region/s may be changed, moved or newly defined, as explained further below in more detail. On the other hand, the glue roller and the glue-application unit may also be configured compatibly in the meaning that the sub-regions defined by their configurations correspond to one another. It is clear that the glue roller and the glue-application unit are arranged to one another such that the glue application by means of the glue-application unit can occur in the sub-region/s of the surface of the glue roller. For example, the accommodating space/s of the glue-application unit are tangentially aligned in the labelling mode along the axial direction of the glue roller such that they extend over the axial area of the sub-region/s to be applied with glue of the surface of the glue roller. The distance of the glue-application unit from the surface of the glue roller in the labelling mode, is adjusted, for example by switching on the glue-application unit at the surface by means of a pneumatic cylinder such that glue located in the accommodating space/s is reliably applied to the surface of the glue roller.

The glue may be hot glue, UV glue or cold glue. Especially preferable, the device according to the invention may be used for applying cold glues, in particular viscous cold glues as, for example, casein glue or dextrin glue. Alternatively, the device may also be used for applying dispersion glue. The device according to the invention may be used for low viscosity glue, glue with a viscosity of between 600 and 80000 mPa s as well as for casein or dispersion glue with an optimal working temperature of 18° C. to 34° C.

According to an embodiment, the glue roller may comprise at least one contact segment corresponding to the one or more sub-regions in the axial direction which is configured such that when contacting the glue-application unit, it accommodates glue in one or more recesses radially receding vis-à-vis the shell surface of the glue roller. The term "radial", here and in the following, relates to the radius of the cylindrical shell surface of the glue roller. According to this embodiment, in the surface of the glue roller there are formed segmented recesses having a smaller distance from the rotary axis of the glue roller vis-à-vis the radius of the shell surface. In the thus configured contact segments, the glue emitted by the glue-application unit therefore can be preferably collected, whereby the sub-regions described above can be defined. The recesses, for example, may have a depth, i.e. a radial deviation of the radius of the shell surface of between 0.02 and 0.08 mm, preferably between 0.03 and 0.05 mm. Thereby, the recesses may be configured homogeneously with the smooth base surface or, however, as described below in more detail, in a structured manner.

The term "contact segment" identifies here and in the following a part of the surface of the glue roller being limited in axial direction in an arbitrary form. Thereby, also contact segments are conceivable deviating from the rectangular form of customary labels so that principally, arbitrary label forms and sizes being compatible with the extent of the surface of the glue roller are conceivable. The contact segment, however, is to be understood that it defines a continuous area of the surface the maximal extent of which, as described above, is smaller than the height of the shell surface of the glue roller. Thereby, the contact segment does not necessarily have to have the extent of the labels to be applied with glue. For example, the application of glue to the start and end regions of labels may be realised by means of two contact segments of a considerably lower size than the labels which are configured separately from one another in the circumferential direction of the glue roller. The glue roller, moreover, can comprise two or more contact segments being arranged separately from one another in the axial direction which, for example, can be used for applying glue to body labels and shoulder labels, also simultaneously. The number and form of the contact segment is only limited by the extent of the surface of the glue roller and by the above mentioned conditions, in particular the limited extent in the axial direction of the glue roller. It is decisive that the contact segment or segments defines/define localised sub-regions of the glue roller in the axial direction in which precisely and exclusively glue is to be applied. Thereby, on the one hand, it can be achieved that glue is only applied there where it is actually required depending on label sizes, label form and/or the gluing regions leading to a reduced glue consumption. On the other hand, it can be avoided that the applied glue unnecessarily comes into contact with the ambient air which may lead to a modification of the chemical properties of the glue. In addition, no surplus glue is applied to the glue roller which would not be removed by the labels and, thus, would run down at the glue roller. Consequently, it may be dispensed with the otherwise usual collecting of the glue running down the glue roller and its return flow into the circulation.

According to a special embodiment, the at least one contact segment can be configured such that it extends only over a part of the circumference of the shell surface of the glue roller. In addition to the limitation of the contact segment in axial direction, the contact segment, thus, is also limited in the circumferential direction. In particular, the length of the contact segment can be selected in circumferential direction compatibly to the length of the labels to be applied with glue. It is also conceivable to provide several equally formed or differently formed contact segments being contrasted from one another along the circumference of the shell surface, for example, in order to realise a start and end gluing of labels.

In a further embodiment, the surface of the glue roller in parts of the surface outside the contact segments at least comprises a smooth surface. For example, the surface of the glue roller can be smooth between the contact segments. In particular, the entire surface of the glue roller can be smooth in the region of the shell surface outside the at least one contact segment and in the radius of the shell surface. In this manner, during operation, it is possible to apply only the sub-regions defined by the contact segments with glue and to keep the remaining regions essentially free of glue. For example, glue applied to the smooth regions can be removed by elements of the glue-application unit brought into contact with the surface of the glue roller, as they are described further below in more detail so that no glue remains on the smooth regions.

According to an embodiment, the one or more recesses may be configured as recesses ngraved or milled into the surface, as gaps of a structure of the surface in the form of a grid, a perforated sheet, or a fabric, or as a combination therefrom. In the region of the contact segments, the surface of the glue roller can thus comprise a structure consisting of a plurality of alternating recesses and projections. Thereby, the upper edges of the projections are placed on the shell surface, whereas the recesses as described above are placed below at between 0.02 and 0.08 mm, preferably between 0.03 and 0.05 mm. Recesses and projections thereby can form principally every arbitrary pattern which, for example, can be produced by means of laser engraving and/or milling. In particular, the contact segments are conceivable in the form of a grid, a perforated sheet or a fabric. The size of the recesses as well as the width of the projections, e.g. the mesh width of a grid or a fabric and the perforation size of the perforated sheet, thereby determine the amount of the accommodated glue. Thus, depending on the glue type and the label type, ideal surface structures can be defined in order to guarantee a reliable application of glue to the labels.

According to a further embodiment, the glue roller can comprise a base roller which is configured such that at least one surface element of the glue roller can be interchangeably mounted at the base roller, wherein the at least one surface element is in particular configured such that it comprises at least one contact segment. For example, the base roller can comprise a cylindrical form the radius of which is smaller about the thickness of the surface element than the radius of the shell surface. The base roller can be operated as usual by means of a controllable and/or adjustable drive unit. The surface element may e.g. be configured as a hollow cylinder which is put over the base roller and mounted to the same. In this case, the at least one contact segment is defined on or in the surface element. For example, the hollow cylinder in the region of the contact segments can be configured, as described above, as grid, perforated sheet, or fabric. In this case, the surface element removed from the base roller may be particularly easily cleaned from glue remainders. Alternatively, the recesses may, however, be configured in the outer surface of the surface segment without passing through the same.

Both configurations of the contact segments can also be realised if the surface segment is not completely put over the base roller but is only mounted at a sub-region of the base roller, for example, as an insertion into a recess of the base roller being provided there. In this case, in particular two or more surface elements may be provided which are mounted at different regions of the base roller. The individual surface elements can comprise one or more contact segments, respectively, and may be removed and exchanged by other surface elements independently from one another. On the one hand, this simplifies cleaning the surface elements, on the other hand, however, increases enormously the fields of application of the glue roller. A product change to a different label form, thus, can occur by means of simply exchanging one or more surface elements.

The surface element or elements may according to their configuration be mounted with most diverse devices to the base roller. For example, a clamping connection by means of a clamping ring or a tension ring can be used in order to mount the surface element to the base roller. Alternatively or additionally, the base roller can be provided with swallow tailed recesses into which the corresponding counter elements of the surface elements can be inserted. A plurality of alternative mounting devices is conceivable here. Decisive thereby is only the fact that the glue roller composed of base roller and surface element(s) complies with the above mentioned requirements.

By configuring the glue roller according to the embodiment, it may be dispensed with a complete exchange of the glue roller in case of a product change. Thereby, the glue roller can be easily retooled for labels of different sizes and forms. Further, the amount of the glue to be transferred may be modified by exchanging the surface elements by, for example, using fabric and grid insertions having greater or smaller mesh distances and/or mesh strengths. Similar to the above described glue roller, also regarding the surface elements, the region of the surface elements outside the contact segments can be smooth in order to allow a precise and exclusive discharge of glue to the contact segments.

As mentioned above, alternatively or additionally, also the glue-application unit can be configured such that glue located in the at least one accommodating space is only applied in one or more sub-regions of the surface of the glue roller. For this, the glue-application unit may in particular comprise two or more accommodating spaces which are spatially separated in the axial direction of the glue roller. Thereby, the spatial separation in the axial direction of the glue roller is to be understood such that there is a region between adjacent accommodating spaces which is not applied with glue, wherein the extent of this region in the axial direction due to the construction goes beyond the thickness of the axial side limiting elements of the accommodating spaces. In other words, the glue-application unit comprises two or more sub-units having separate accommodating spaces, wherein the sub-units per se are spatially offset from one another in the axial direction of the glue roller. This explicitly differs from the sub-regions of an accommodating space of the glue-application unit described further below which are separated from one another by separating elements. In particular, the two or more accommodating spaces which are spatially separated according to this embodiment are connected with respectively own transport lines for the glue to be applied and therefore, may be filled with glue and operated independently from one another. For example, the glue-application unit can comprise separate accommodating spaces for body and shoulder labels so that applying of shoulder labels can be flexibly switched or that it may be changed between body and shoulder labels.

The accommodating spaces which are spatially separated may be arranged along the axial direction of the glue roller such that axial sub-regions glued by them define the above described sub-regions of the axial extent of the glue roller. The sub-regions that can be applied with glue, thereby, may in particular correspond to the above described contact segments of the glue roller. The sub-regions that can be applied with glue, however, may also be greater configured than the contact segments of the glue roller, wherein the surface of the glue roller outside the contact segments as described above is smooth. In this manner, by exchanging the glue roller or the already mentioned surface elements, a readjustment to labels of different size and/or form may occur in a simple manner.

The glue supply to the accommodating spaces which are spatially separated may in particular be controlled and/or adjusted by means of a programmable logic controlling and/or adjusting unit of the labelling apparatus. For this purpose, the labelling apparatus may be provided with one or more controllable glue pumps and/or control valves in the transport lines for the glue. The control and/or adjustment unit may control and/or adjust the amount of the supplied glue depending on at least one control parameter originating from the group formed by the following parameters: the type of the labels to be applied with glue, the number of the labels to be applied with glue per time unit, the variety of the used glue, the temperature of the used glue, the ambient temperature of the glue roller or the glue printer and the surface of the labels to be applied with glue. Programmable logic controlling and/or adjusting units are well-known in the prior art, wherefore it is dispensed with a detailed description. It is clear that known elements as a processor unit, a reproducing assembly, as for example a monitor or a touch-screen, an input unit as for example a keyboard or a touchscreen, a storage unit, in particular for storing one or more of the above mentioned parameters in the form of a type management, and the like may be part of the mentioned programmable logic controlling and/or adjusting unit.

Some of the control parameters as, for example, the type of the labels to be applied with glue, the variety of the used glue or the surface of the labels to be applied with glue can be predetermined in the form of a type management by reading them out from the above mentioned storage unit in the event of a product change. Other control parameters, as for example the number of the labels to be applied with glue per time unit, the temperature of the used glue or the ambient temperature of the glue roller can be determined by corresponding sensors, e.g. optical sensors for measuring the flow capacity at containers or temperature sensors and can be used for controlling glue pump and/or the control valves. The controlling and/or adjusting unit, for example, can control the glue pump depending on the measured flow capacity such that exactly the quantity of glue is removed from the storage container or supplied to the accommodating space/s that is required for applying the corresponding number of labels with glue and for the corresponding sub-regions of the glue roller. Further control parameters as for example a viscosity of the glue or a surface quality of the containers to be labelled can be taken into consideration during controlling and/or adjusting the glue supply. The type of the labels to be applied with glue can comprise also the size and the format of the labels besides the material of the labels. Labels may, for example be designed as wrap-around labels or front- and rear side labels. As well, body labels and shoulder labels for bottles to be labelled may be provided. The glue type as described above can e.g. be given by a casein glue, a dextrin glue or a dispersion glue. The ambient temperature of the glue roller has an influence on the adhesion properties of the glue on the label and, thus, on the amount of the glue from the label or the pallet removed from the glue roller.

According to an embodiment, the glue-application unit can comprise at least one controllable scraper on the glue roller side with which the at least one accommodating space on the roller glue side can be in particular hermetically sealed. For this, the controllable scraper can be configured and arranged such that by means of a controllable actuator, for example, a pneumatic cylinder or a servomotor of the glue-application unit, it may be moved in front of the opening of the accommodating space on the side of the glue roller in order to hermetically seal the same. During operation, the scraper is automatically opened to an extent that the glue located in the accommodating space may again contact the glue roller surface and the glue roller immediately is again operable. In order to be able to hermetically seal the accommodating space, one of the below described peripheral-side wall elements of the glue-application unit can comprise a fillet or the like, into which the scraper can be moved. Thus, the glue chamber, i.e. the accommodating space, can be sealed in case of longer interruptions of the labelling operation or at the end of the shift over night by means of the scraper so that the glue located therein is protected against drying out and against modifying its chemical properties by contacting the ambient air. The glue-application unit, as described below, can be switched off from the glue roller in this idle or cleaning mode so that the glue roller may be cleaned, for example, by means of an adjustable rotating brush and water or by another cleaning liquid. Since the glue, thus, can remain in the hermetically sealed accommodating space of the glue-application unit, it can be dispensed with the otherwise usual return flow line of the scraper, i.e. the glue-application unit.

According to a special embodiment, the scraper can comprise two or more individually controllable segments which are assigned to different regions of the accommodating space in the axial direction of the glue roller. Since the accommodating space is aligned in the axial direction of the glue roller, these segments independently controllable from one another, thus, define sub-regions separated from one another in the axial direction of the glue roller. If a segment of such a scraper is opened, the corresponding sub-region is applied with glue. In this manner, by individually controlling the segments of the scraper, a flexible selection of the sub-regions to be applied with glue can occur. For this, the accommodating space only has to be filled with glue up to the top opened region of the accommodating space with regard to the axial direction of the glue roller. Ideally, the accommodating space is completely filled with glue during the operation with a segmented scraper so that only opening and sealing the segments defines which axial sub-regions are applied with glue. For individually controlling the segments, the glue-application unit may be provided with corresponding mechanisms, for example, a corresponding number of pneumatic cylinders or servomotors. With the described embodiment, thus, also by means of only one single accommodating space, a flexible gluing device for different axial sub-regions of the glue roller can be realised. For example, similar to the above described embodiment with accommodating spaces which are spatially separated, the scraper may comprise two or more segments which are assigned to the individual sub-regions on the surface of the glue roller. For example, a segment for body labels and a segment for shoulder labels can be provided. Adjacent segments may thereby be separated from one another by fixed webs permanently sealing the accommodating space in the corresponding axial sub-region so that the corresponding sub-regions of the surface of the glue roller are not applied with glue.

According to a special embodiment, the different regions of the accommodating space may be separated from one another by one or more separating elements. The sub-regions separated as such may thereby be filled with glue via separate junctions of the transport line for glue. Control valves in the junctions allow to independently fill the individual sub-regions. In addition, the separating elements may be configured with one thickness corresponding to the axial extent of the respective sub-regions not to be applied with glue of the surface of the glue roller. By means of controlled filling of the corresponding sub-regions, even in case of a non-segmented scraper, an individual glue application to the desired sub-regions of the surface of the glue roller can occur. It is clear that the embodiments described here with specifically configured scrapers may also be applied to the above described embodiment with several accommodating spaces which are spatially separated.

According to an embodiment, the glue-application unit can at least comprise a first wall element and a second wall element, wherein the first and the second wall element limit the accommodating space on both sides in the circumferential direction of the glue roller. Thereby, the wall elements may essentially extend along the axial direction of the glue roller, in particular parallel to the axis of the glue roller. The second wall element according to the embodiment is arranged in a moving direction of the glue roller behind the first wall element so that the opening of the accommodating space located between the two wall elements and optionally sealable by the above described scraper is turned towards the glue roller in order to discharge glue. The first and/or the second wall element may in particular be configured such that they are in mechanical contact with the shell surface during the labelling operation, i.e. in particular with the smooth parts of the surface of the glue roller and, thus, contact the same. For example, the first and the second wall element may be resiliently pressed by means of a spring mechanism on the surface of the glue roller. A wall element contacting the glue roller during operation thereby acts as scraper, wherein the wall element arranged in the feed line removes glue remainders and contaminations as label remainders, whereas the wall element arranged in the discharge line prevents the glue from being applied to the smooth regions of the surface of the glue roller.

According to a further embodiment, the first wall element may extend to a direction which includes an angle with the tangent in the circumferential direction to the glue roller lying between 0° and 70°, preferably between 10° and 60° and specifically preferably between 10° and 30°. Thus, the wall element abuts, in particular in the contact region of the glue roller, under a very flat angle whereby even by exerting the spring force, a frictional wear, in particular of the sensitive contact segments, is minimised. Thus, the first and/or second wall element may be a flexible wall element which is, for example, made of an elastic material and presses against the glue roller. By the angle configuration, in addition, scraping or applying of glue on the glue roller is possible in an easier manner. It is clear that the glue-application unit may comprise the above described wall elements for every accommodating space limiting the accommodating space in the circumferential direction of the glue roller.

According to an embodiment, the glue-application unit may further comprise at least one sealing unit sealing the accommodating space on at least one side located in the axial direction of the glue roller, in particular in the direction of the side of the gravity. Due to this sealing unit, it is avoided that the glue located in the accommodating space flows uncontrollably out of the glue-application unit. Preferably, the glue-application unit may comprise two sealing units sealing the accommodating space on both sides in the axial direction. Together with the wall elements, a rear wall of the accommodating space and optionally with the above described scraper, the sealing units, thus, form a sealable hollow chamber with a glue roller side opening for applying the glue located in the hollow chamber onto the surface of the glue roller. It is clear that the glue-application unit may comprise such an arrangement for each of the above described accommodating spaces which are spatially separated. In the rear wall of the accommodating space, furthermore, an opening for connecting the transport line may be provided via which the accommodating space is filled with glue. For reliably sealing the accommodating space, the glue roller may comprise sealing regions of the surface of the glue roller configured corresponding to the sealing unit or units and in particular smooth which are contacted by the sealing unit or units. By configuring a smooth surface in the sealing regions, the sealing effect between the glue roller and the sealing units can be improved. During operation of the glue roller, the sealing units slide on these smooth surfaces. For this, the sealing units can be made of an appropriate, low-friction material, for example of stainless steel.

In a further embodiment, the glue-application unit does not comprise a discharge unit or discharging glue from the accommodating space. Only a vent hole with a valve may, for example, be provided in the rear wall or side wall of the accommodating space. Thereby, the vent hole is preferably arranged above the opening of the transport line for supplying glue so that the glue located in the interior of the accommodating space constantly is under an essentially permanent pressure and can be evenly distributed.

The glue-application unit and/or the transport line for the glue may be configured by means of a controllable heating and/or cooling device in a heatable and/or coolable manner. A heating device, for example, may be provided as heating coil. Heating and cooling devices are sufficiently known in the prior art and are therefore not described in detail.

According to an embodiment, the glue-application unit may be pivotedly mounted at a carrier. Thereby, an actuator, for example, a pneumatic cylinder can be provided by means of which the carrier and, thus, the glue-application unit can be switched on and off from the glue roller. If e.g. in the feed line of the labelling apparatus there are no containers to be labelled any more, the glue-application unit may be switched off from the glue roller and the labelling apparatus may be depleted. Subsequently, the glue roller, for example for cleaning or retooling to other labels may be stopped.

Furthermore, the glue roller and/or the glue-application unit may be configured movably in the axial direction of the glue roller. For this purpose, a linear motor, for example with a spindle drive may be used shifting the bearing of the glue roller and/or the glue-application unit in the axial direction of the glue roller. By means of a movable configuration of the glue roller and/or the glue-application unit, the position of the sub-regions to be applied with glue of the surface of the glue roller may be adapted to the position of the labels to be applied on the container.

The glue roller may be operated via a direct drive, for example, by means of a servomotor. Thereby, the glue roller can be designed specifically light, e.g. as hollow cylinder which, for example, can be coupled via a serration to the drive and, thus, can be easily exchanged. The drive of the glue roller may be designed such that one rotation of the glue roller corresponds to one label separation on the vacuum cylinder or the pallet separation. Thereby, the circumference of the glue roller is greater than the maximal processing length of one pallet or the maximal length of the label to be applied. Further, the glue roller may also be adjustably configured so that the gluing can correspond exactly to the desired contour of the labels.

The above described embodiments allow to apply the glue exclusively in such regions to the surface of the glue roller, where it is removed by the labels to be applied. Thereby, on the one hand, the total amount of the consumed glue is reduced and on the other hand, the glue is prevented from touching dry at the glue roller. In addition, it can be dispensed with a return flow of glue being otherwise usual. The used glue rollers may be configured such that required retooling to a different label type can be carried out in a simple and fast manner. In addition, the used glue-application units can be configured such that it can be flexibly reacted to product changes. Moreover, different operation states, as e.g. a labelling mode, an idle mode, a cleaning mode, etc. can be adjusted in a specifically easy and preferable manner.

BRIEF DESCRIPTION OF THE FIGURES

Further features and exemplary embodiments as well as advantages of the present invention are explained in the following in more detail by means of the drawings. It is clear that the embodiments do not exhaust the scope of the present invention. It is further clear that some or all of the features described in the following may also be combined in any other way with one another.

DETAILED DESCRIPTION

In the following, the same or similar elements are identified with the same reference signs. For clarity reasons, it is dispensed with a repeated description of these elements. In addition, it is clear that in the following embodiments some or all elements can be replaced by or combined with similar elements which are described in connection with other embodiments.

Figure 1A:
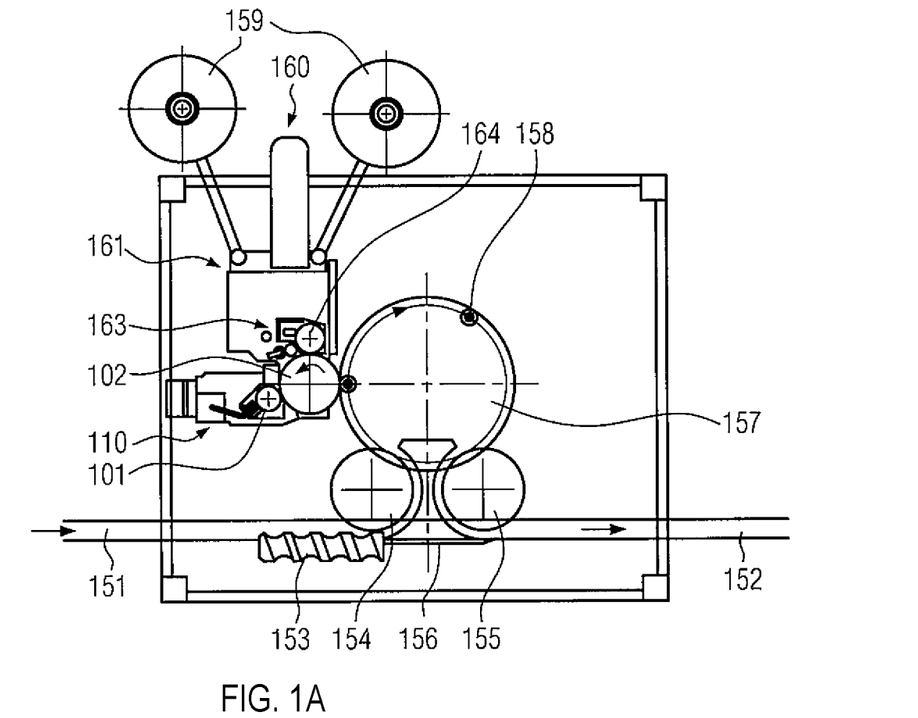
FIG. 1A shows a schematic top view of a labelling apparatus according to which the glue is applied directly from the glue roller to the labels.

FIG. 1A shows a schematic top view of a labelling apparatus according to which the glue is applied directly from the glue roller to the labels. The gluing device of FIG. 1A is shown in a detailed view in FIG. 1B. The shown labelling apparatus has the following elements principally known from the prior art: a supply conveyor 151 for the continuous supply of the containers to be labelled, an infeed star wheel 154 with an upstream infeed worm 153, a guide bend 156, a carousel 157 with a plurality of rotary plates 158 evenly placed on a joint pitch circle, a discharge star wheel 155 and a discharge conveyor 152 for discharging the labelled containers. In the circulation area between the infeed star wheel 154 and the discharge star wheel 155, at the outer periphery of the carousel 157, there is located a labelling unit 161 for applying the labels onto the containers. The labelling unit 161 exemplarily shown here has two label roll capacities 159 and a splicing station 160 lying in between, a cutting unit 163, and a gluing device 110 with a vacuum cylinder 102 for transferring the pre-sliced, glued labels to the passing containers.

The labelling process of one container occurs in detail as follows: the containers generally butt-conveyed by the supply conveyor 151 are moved apart from the laterally arranged infeed worm on the division of the infeed star wheel so that this can transfer the accommodated containers in cooperation with the opposing guide bend 156 onto the rotary plates of the rotating carousel 157. There, the containers are clamped by centering bells (not shown) and are tangentially guided past the vacuum cylinder 102 of the gluing device 110 by the rotating movement of the carousel 157. Simultaneously, from a label roll capacity 159 a label roll is controllably removed and sliced into individual labels in the cutting unit. The separated labels which are located with the print image pointing outwards on the rotating vacuum roll 164 during the cutting process are transferred to the vacuum cylinder 102 after the cutting process from where they are guided past the glue roller 101 with the rear side pointing outwards and are provided with glue in a certain area of the label depending on the label type. The labels applied with glue are tangentially fed to the carousel 157 on which the containers are located. The labels to be applied are thereby with the application of glue brought into contact with the containers and are unrolled to the same by means of a suitable movement. After passing the gluing device 110 and after completion of applying the label onto the container, the labelled container is transferred to the discharge conveyor 152 by the discharge star wheel 155.

Figure 1B:
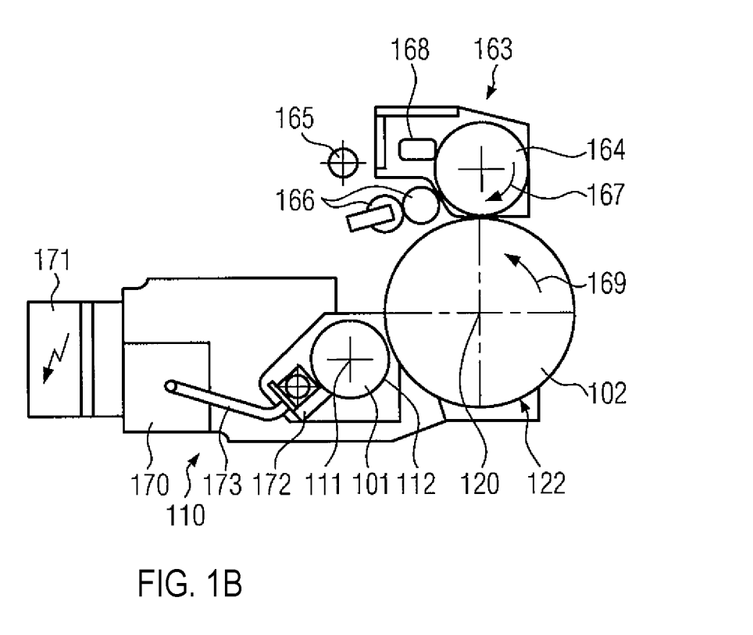
FIG. 1B shows the gluing device of FIG. 1a in a detailed view.

In the detail view of FIG. 1B, in addition to the gluing device 110, the cutting unit 163 can be seen. The label roll removed from the label roll capacity 159 is supplied to the cutting unit 163 via a return pulley 165 and the roll pair 166. There, the label roll abuts the rotating vacuum roll 164 which rotates in the direction of the arrow 167 and is cut by a separation element 168 pursuant to the cutting marks or the print image. The sliced labels are transferred to the vacuum cylinder 102 which rotates in the direction of the arrow 169. The labels, thus, abut the shell surface 122 of the vacuum cylinder 102 which rotates about the axis 120. The shell surface 122 of the vacuum cylinder 102 comprises elements (not shown) accommodating the beginning or the end of the label, respectively. For accommodating different label lengths, the vacuum cylinder can be exchanged.

When moving the labels past the glue roller 101, the individual areas or the entire rear side of the labels are brought into contact with the glue roller so that they are provided with glue at certain positions. The amount of the transferred glue thereby depends on the label type and the areas to be applied with glue. In order to be able to provide a label with glue, a gluing device 110 is required. The gluing device 110 shown in FIG. 1B is configured according to the present invention with a glue roller 101 and a glue-application unit 172. By a device 170 which is heatable by means of an optional glue heater 171 for removing glue from a storage container for storing glue, for example a controllable glue pump, the removed glue is guided via a transport line 173 to a glue-application unit 172 which is schematically shown here, and is by means of this transferred to the surface 112 of the glue roller 101 rotating about the glue roller axis 111. The glue-application unit 172 thereby, as shown below in more detail, is configured as chamber glue scraper having at least one accommodating space for glue which may be located so close to the glue roller 101 that glue can be applied through an opening of the accommodating space of the surface 112 of the rotating glue roller 101.

Figure 2A:
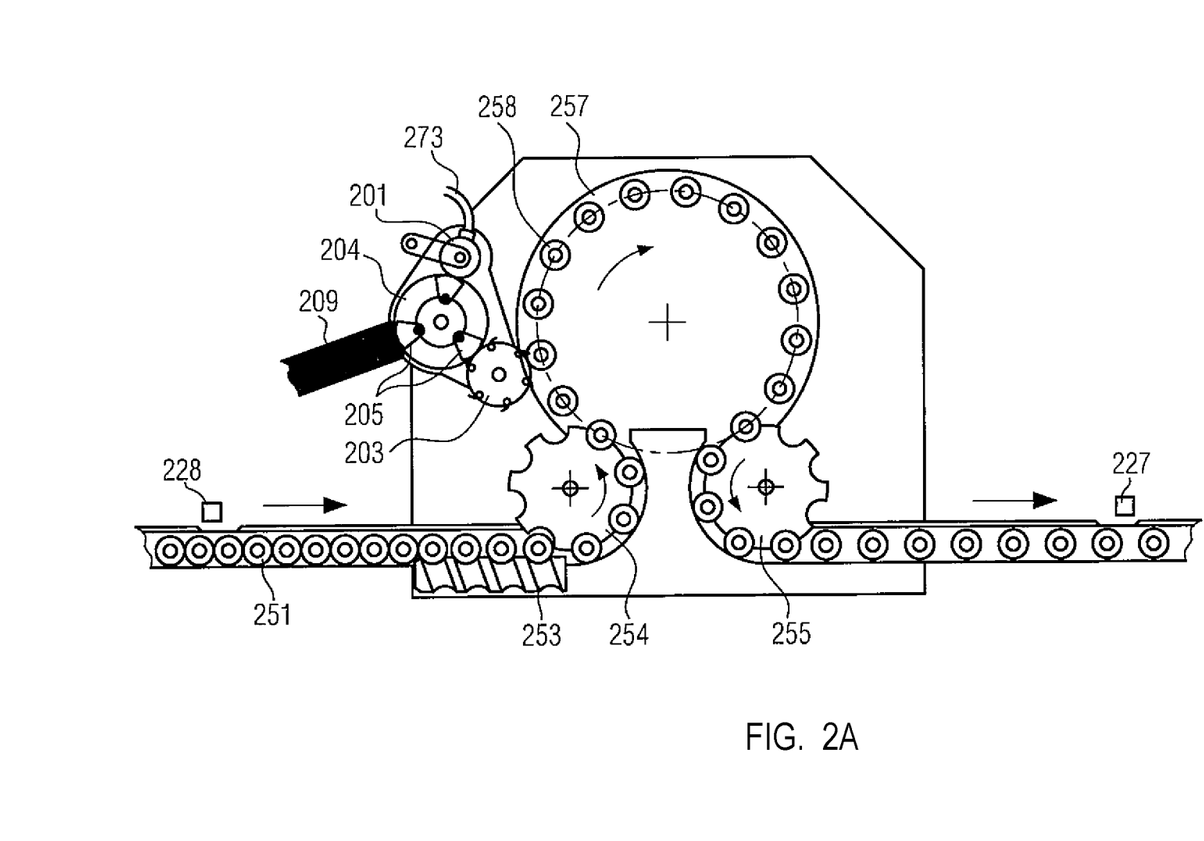
FIG. 2A shows a schematic top view of a labelling apparatus according to which the glue is applied via a pallet carousel to the labels.
Figure 2B:
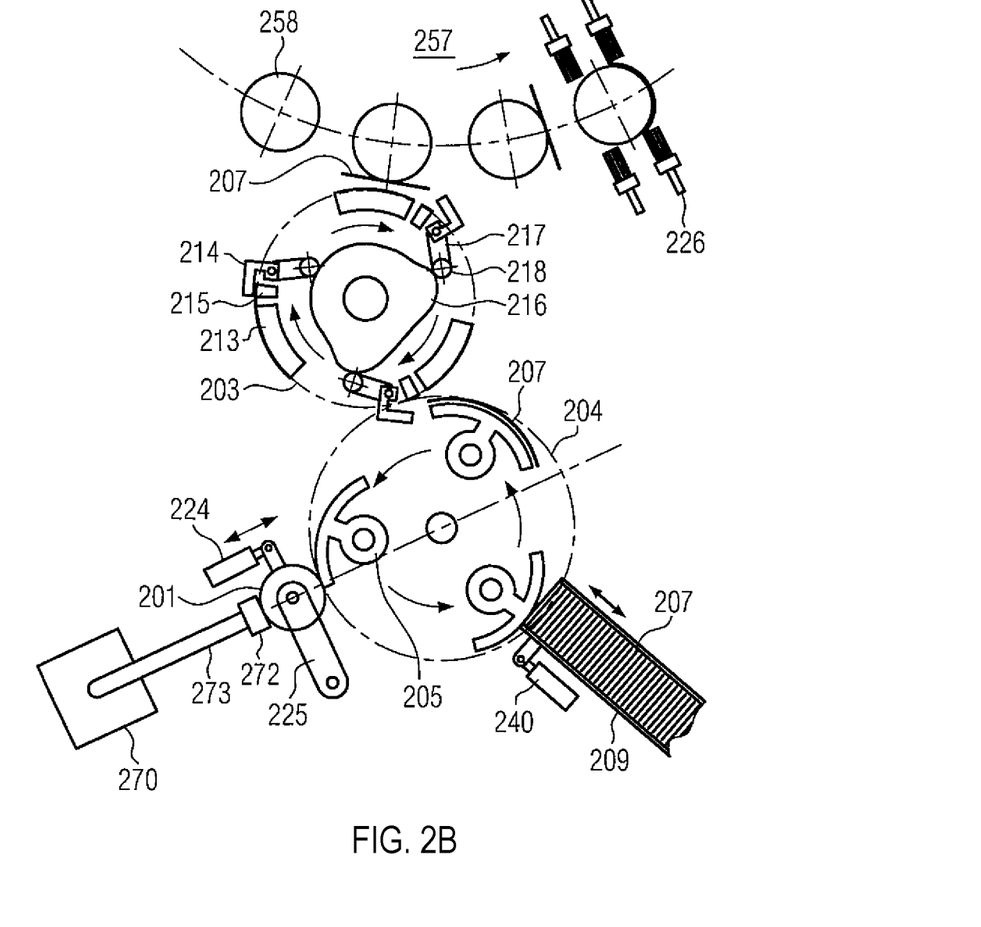
FIG. 2B shows the gluing device of FIG. 2a in a detailed view

FIG. 2A shows a schematic top view of an alternative labelling device according to which the glue is applied via a pallet carousel to the labels. A detail view of the gluing device of FIG. 2A is shown in FIG. 2B. On a rotating carrier 204 of the carousel several removing elements 205, so-called pallets are rotatably arranged. During rotation of the pallet carousel, the accommodating surface of each removing element 205 rolls off the glued surface of the glue roller 201, removes a label 207 from the label container 209 by means of adhesion, whereby this is applied with glue on the rear side, and transmits it to the gripper cylinder 203 that transfers it to the containers. These were supplied beforehand in an infeed flow 251 of an infeed worm 253 which produces the separation required for the infeed star wheel 254. Along the infeed flow 251, moreover, a sensor 228 for determining a flow capacity at containers to be labelled may be arranged. From the infeed star wheel 254, the containers to be labelled are transferred to the rotating plates 258 of a carousel 257 which guides the containers past the gripper cylinder 203. Also here, by means of suitable rotating of the containers accommodated by the rotating plates 258, unrolling of the label to be applied supplied by the gripper cylinder 203 is effectuated on the surface of the container. The labels applied to the container may subsequently be pressed on the container by means of brushes 226. The labelled container are finally transmitted to a discharge flow via a discharge star wheel 255 where an optical sensor 227 can carry out a quality control of the labelled containers.

Further details of the labeling unit are shown in FIG. 2B. For example, the label container 209 may be switched on the pallet carousel 204 via a pneumatic cylinder 240 in the labeling mode and can be switched off by the same in the idle mode. The pallets 205 of the pallet carousel 204 may be pivoted by a control curve (not shown) such that they are applied with glue by the glue roller 201 and subsequently accommodate one label 207 each from the label container 209. The glue roller 201 can be mounted at a pivoting support 225 by means of a pneumatic cylinder 224, whereby it can be switched on to the pallet carousel 204 in the labeling mode and switched off the same in the idle mode. Via the transport line 273, the glue from the storage container (not shown) removed by the removing unit 270 is supplied to a glue application unit 272 which is schematically shown here, for example in the form of a chamber glue scraper, which transfers the glue to the surface of the glue roller 201. The labels 207 removed by the pallets 205 from the label container 209 are transferred to the gripper cylinder 203. This takes over the respective label 207 by means of a gripper finger 214 and an anvil 215 from the pallet 205, wherein the glued side of the label 207 is placed on gripper sponge 213. The movement of the gripper fingers 214 mounted on gripper arms 217 is thereby effectuated due to the unrolling of the gripper rolls 218 which are also mounted on the gripper arms 217 onto a control curve 216 of the gripper cylinder 203. For transferring the labels 207 to the containers, the gripper fingers 214 are newly opened.

Figure 3:
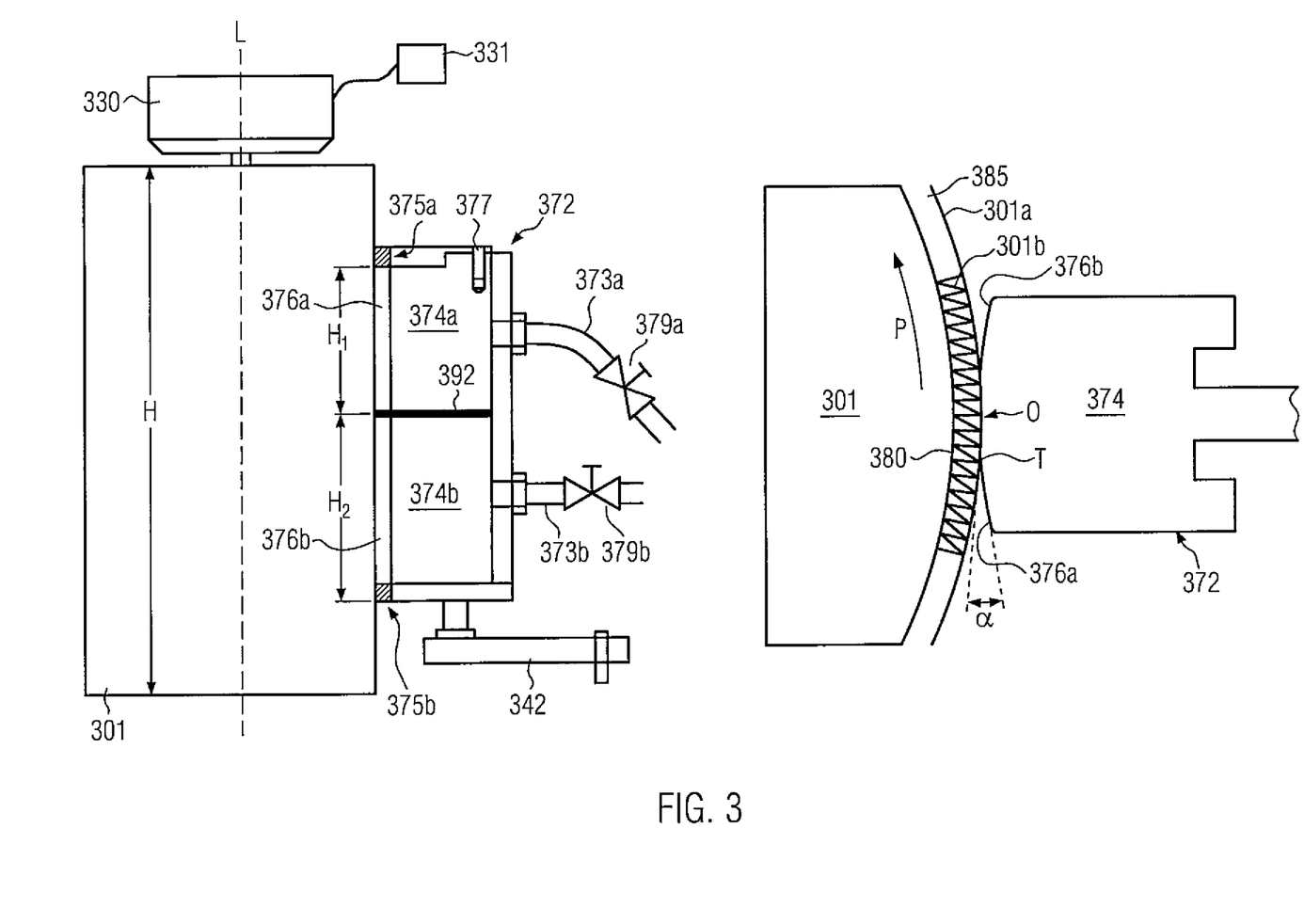
FIG. 3 schematically shows an exemplary embodiment of a glue roller and a glue-application unit according to the present invention.

FIG. 3 schematically shows an exemplary configuration of a glue roller and a glue-application unit in the form of a hollow chamber glue scraper according to the present invention. In the Figure due to lack of space, there are shown several optional elements combined with one another which, however, as described above may also be provided separately from one another. The shown embodiment comprises a glue roller 301 from which in the left part of the Figure, there is shown the strictly cylindrical shell surface in a cross-section. The maximal overall extent of this shell surface in the direction of the rotary axis L about which the glue roller 301 is rotated by means of the drive 330 in the Figure is identified by H. The height H simultaneously corresponds to the axial extent of the surface of the glue roller which may be maximally applied with glue. The drive 330 in this embodiment is configured as controllable servomotor which is controlled by means of a controlling and/or adjusting unit 331.

A glue-application unit 371 according to the present invention is assigned to the glue roller 301 at its circumference, wherein the glue-application unit 372 is shown in operation. The accommodating space of the glue-application unit in this non-limiting embodiment is divided into two regions successively following one another in the axial direction by providing a separating element 392 which may be supplied with glue independently of one another via separate transport lines 373a and 373b by independently controllable control valves 379a and 379b. It is clear that the glue-application unit 372, as described above, also can comprise only one accommodating space and one transport line. The sub-regions of the accommodating space shown here cover consecutive sub-regions of the axial extent of the surface of the glue roller by heights $H_1$ and $H_2$. According to the invention, the overall extent $H_1+H_2$ of the sub-regions of the surface of the glue roller 301 which can be applied with glue is smaller than the overall extent H of the surface of the glue roller—as seen in the axial direction of the glue roller.

The glue-application unit shown in this configuration further is pivotedly mounted at a carrier 342 so that the entire glue-application unit in operation may be switched on the surface of the glue roller 301 and in the idle mode or the cleaning mode may be switched off from the same. In the left part Figure, there are furthermore shown sealing units 375a and 375b sealing the accommodating space of the glue-application unit upwards and downwards in the axial direction so that no glue can escape uncontrollably. Preferably, these sealing units slide on the smooth part of the surface of the glue roller. In addition, the Figure shows an optional vent hole 377 in the upper wall element of the glue-application unit allowing a constant glue pressure in the interior of the accommodating space. Finally, in the left part Figure, the first wall element 376a is indicated limiting the accommodating space in the front in the circumferential direction of the glue roller 301 with regard to the moving direction of the glue roller The arrangement of the first wall element 376a and the second wall element 376b is shown in more detail in the right part Figure by means of a horizontal cross-section through the glue roller 301 and the glue-application unit 372. Since the glue roller 301 rotates in the direction of the arrow P, a surface element of the structure 301b of the glue roller 301 initially hits the first wall element 376a and subsequently the second wall element 376b. In the embodiment shown here, the first as well as the second wall element contact the surface of the glue roller, wherein the wall elements may be pressed on the surface by means of spring elements (not shown). Between the wall elements 376a and 376b extending in the axial direction, there is an opening O of the accommodating space 374 as well extending in the axial direction. The glue escapes through this opening O from the accommodating space 374 and is applied to the structure 301b of the glue roller 301.

The shown cross-section further shows a contact segment 380 according to the present invention. The contact segment 380 is, as can be taken from the Figure, limited in the circumferential direction of the glue roller. The contact segment, as well, is limited to the sub-region to be applied with glue of the surface of the glue roller according to the invention in the axial direction of the glue roller. In the configuration shown here, the surface of the glue roller in the region of the contact segment 380 comprises a structure 301b of recesses and projections being suitable for accommodating the desired amounts of glue from the glue-application unit 372 in the recesses. Outside the contact segment 380, the surface 301a of the glue roller 301 is smooth so that the wall element 376b abutting the wall element prevents glue from being applied to this part of the glue roller. In the configuration shown, the contact segment 380 is configured as part of the further below described interchangeable surface element 385 which on its part is configured in the form of a hollow cylinder. The contact segment, however, may also be configured as part of the glue roller itself.

In order to avoid an excessive frictional wear between the glue roller 301 and the wall elements, the two wall elements 376a and 376b at the bottom are arranged to a flat angle α towards the tangent T in the circumferential direction at the shell surface of the glue roller. In addition, the extent of the wall elements in the axial direction may be selected greater than the extent of the contact segment 380 in the axial direction in order to prevent the wall elements from getting caught in the structure of the contact segment. The angle α as mentioned above, may be between 0° and 70°, preferably between 10° and 60°, and in particular preferably between 10° and 30°.

Figure 4:
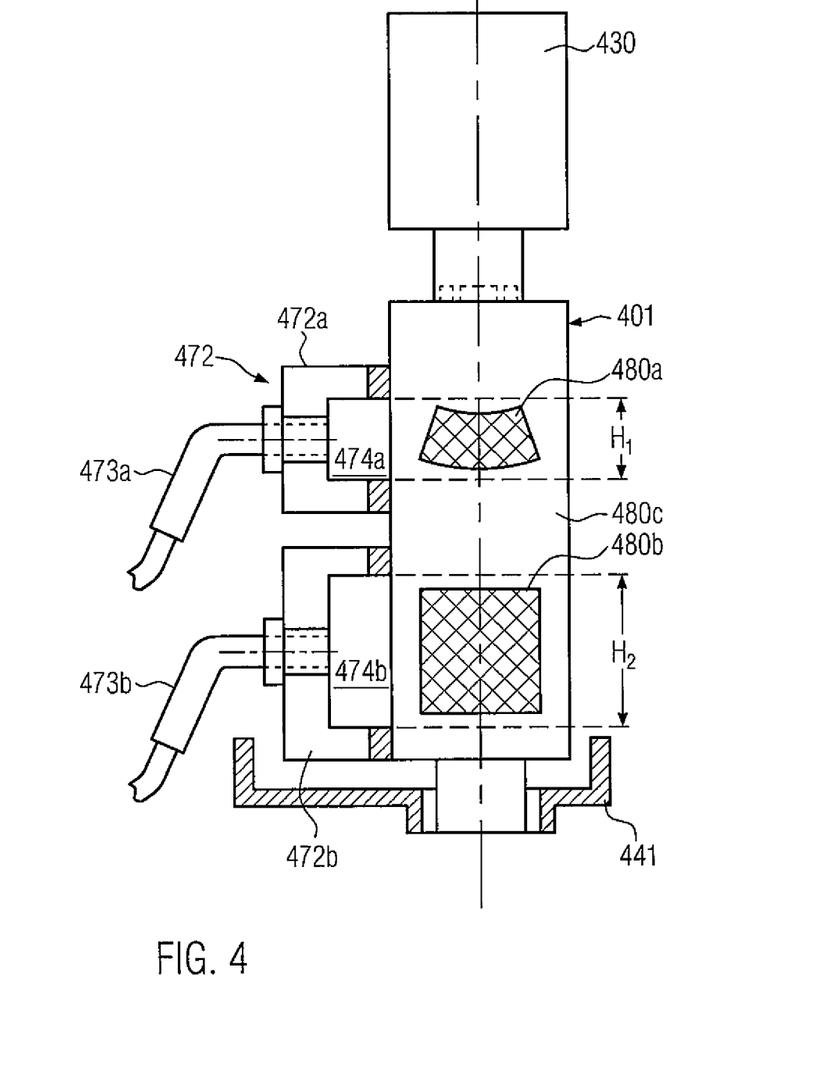
FIG. 4 shows a glue-application unit with two accommodating spaces which are spatially separated according to the present invention.

In FIG. 4, an alternative embodiment of the glue roller and the glue-application unit according to the present invention is shown. In this embodiment, the glue-application unit 472 comprises two sub-units 472a and 472b which are spatially separated from one another in the form of hollow chamber glue scrapers for shoulder or body labels each having an own accommodating space 474a and 474b. The two accommodating spaces are, thus, spatially separated from one another in the axial direction of the glue roller 401 and define sub-regions 480a and 480b which are spatially separated from one another having axial extents $H_1$ and $H_2$ of the surface of the glue roller. Between these sub-regions 480a and 480b, there is located the region not applied with glue 480c. As described above, also here, the rotation of the glue roller 401 about its rotary axis L is effectuated by a controllable drive 430. The sub-units 472a and 472b of the glue-application unit have separate supply lines 473a and 473b for the glue so that the sub-units may be operated independently of one another. Thereby, the shown gluing device may be used, e.g. for applying body labels, if the sub-unit 472b is active. Alternatively or additionally, the gluing device can be used for applying shoulder labels, if the sub-unit 472a is (also) active. Controllable valves in the supply lines 473a and 473b, thereby can control the glue supply depending of the labels to be applied with glue. However, if surplus glue is running down the glue roller, this may be collected in a glue bowl 441. Since the supply of glue to the accommodating spaces 474a and 474b, however, can occur controllably such that constantly only the required glue is supplied, it can be dispensed with a return flow line of the hollow chambers.

Figure 5:
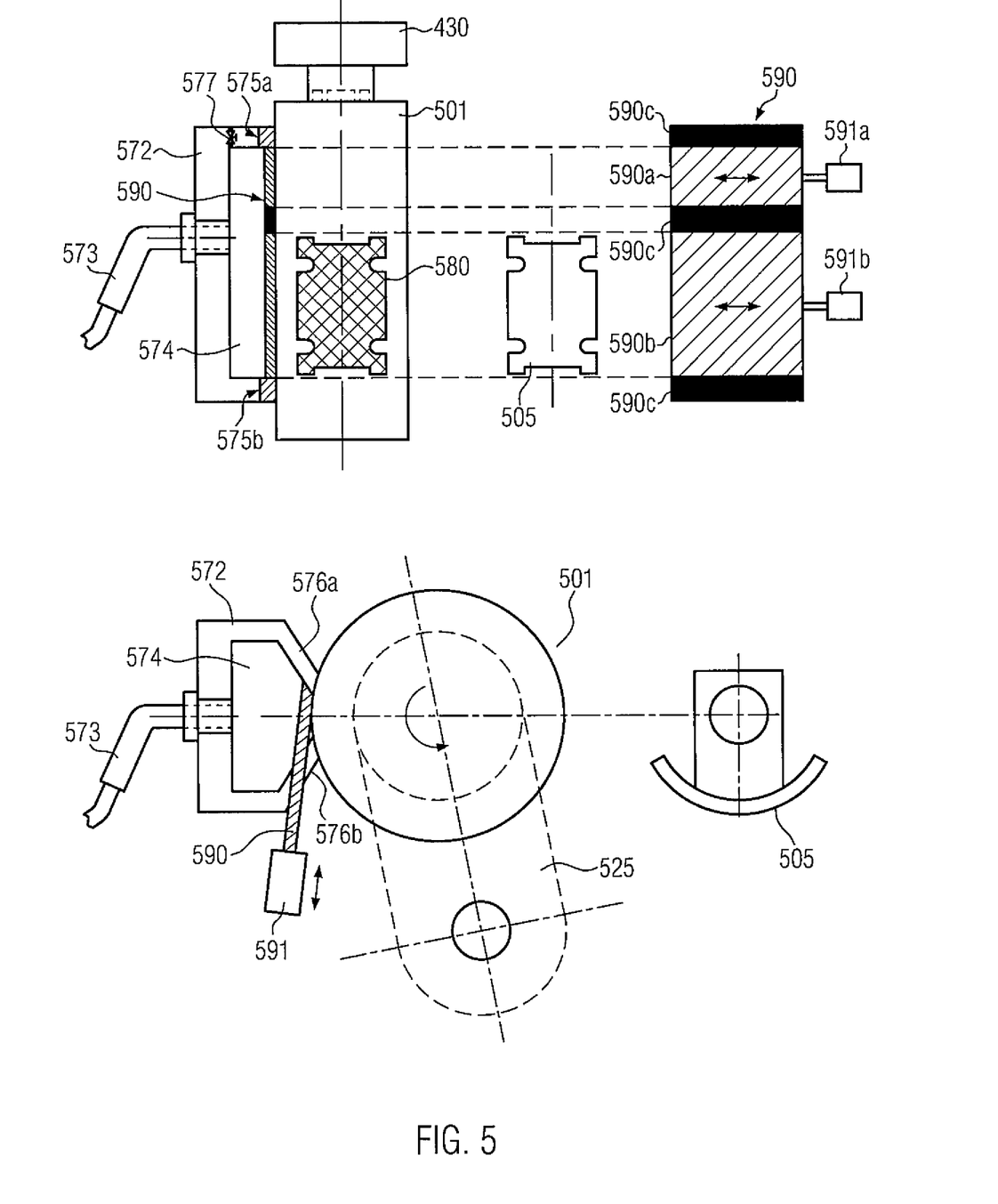
FIG. 5 shows a glue-application unit with a segmented scraper according to the present invention.

In FIG. 5, a further embodiment of the glue-application unit according to the present invention is shown. In this embodiment, the glue-application unit 572 only comprises one glue chamber 574 with a supply line 573 for the glue. Whereas the upper part Figure shows the gluing device in a perpendicular cross-section, in the lower part Figure, the corresponding horizontal cross-section is shown. In addition to the glue roller 501 and the glue-application unit 572, the Figures further show an exemplary pallet 505 which is pivotedly mounted at a pallet carousel. The curved contact surface of the pallet 505 thereby has a form corresponding to the form of the structured contact segment 580 of the glue roller 501 so that the glue applied to the contact segment may be accommodated nearly completely by the pallet 505. The glue roller 501 in this embodiment as well is operated by a controllable drive 430. In addition, here, the glue roller 501 is pivotedly mounted on a carrier 525 which may be switched on to the pallet carousel, for example by means of a pneumatic cylinder (not shown). Thereby, the glue-application unit 572 may be configured pivotedly together with the glue roller.

Similar to the preceding embodiments, also here, the glue-application unit 572 comprises sealing units 575a and 575b sealing the glue chamber 574 upwards and downwards. Additionally, in this embodiment, a vent hole 577 is shown for venting the hollow chamber. Furthermore, the glue-application unit 572 in this embodiment has a segmented scraper 590 which may be moved by means of an actuator 591 in front of the opening of the glue chamber 574 such that the same is hermetically sealed on the glue roller side. Thus, the glue located in the glue chamber 574 may be prevented from drying in case of longer interruptions of the labelling operation. For continuing the labelling operation, the scraper 590 is again retracted in order to unblock the opening of the chamber glue scraper 572 again.

As mentioned, the scraper 590 is configured in a segmented manner in the shown embodiment. In particular, the scraper 590 comprises two controllable segments 5980a and 590b which can be controlled independently of one another by means of the actuators 591a and 591b between which a stationary segment 590c is located (cf. right-hand side of the above part Figure). In the region of the sealing units 575a and 575b, as well, the scraper 590 is configured with stationary segments 590c. By individually controlling the segments 590a and 590b, different sub-regions of the glue roller 501 may be applied with glue independently of one another. In the shown configuration of the glue roller 501 with a contact segment 580 for a body label, for example, the upper segment 590a of the scraper 590 can remain sealed, whereas the lower segment 590b is opened. Even in case of a completely filled glue chamber 574, thus, in this configuration, glue is exclusively applied in the region of the contact segment 580 to the glue roller. The supply of glue via the supply line 573, in this case, may be correspondingly reduced vis-à-vis the simultaneous applying of body and shoulder labels.

Figure 6:
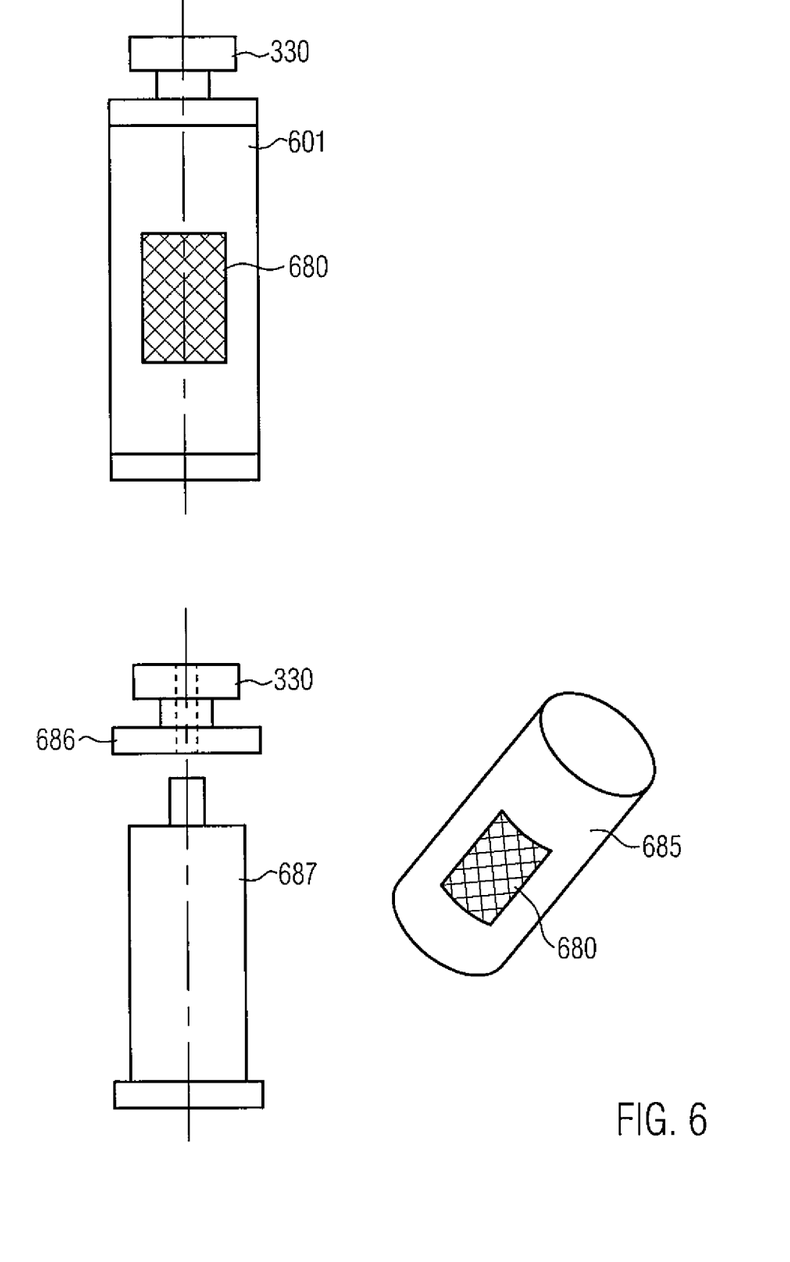
FIG. 6 shows a glue roller with interchangeable surface element according to the present invention.

FIG. 6 finally shows a glue roller with an interchangeable surface element according to the present invention. In the shown configuration, the glue roller being once again operated by a controllable drive 330 a base roller 687 over which a surface element 685 in the form of a hollow cylinder may be completely put. By removing the cover 686 and the drive 330, thus, in an easy manner, a retooling of the gluing device may occur. Thereby, the contact segment 680 is configured on or in the cylindrically shaped surface element 685. In particular, the contact segment 680 may be configured in the form of a grid, a perforated sheet or a fabric the opening of which passes through a surface element for an easier cleaning. Alternatively, the contact segment 680 as described may be configured in the surface of the surface element 685. As described above, instead of a complete surface element, it may also be used one or more surface elements which may be inserted into or connected to recesses of the surfaces of the base roller 687. In this manner, a flexible design of the glue roller 601 may be achieved for a plurality of different label forms and sizes.

The described embodiments allow to precisely apply glue exclusively in the sub-regions of the surface of the glue roller where it is accommodated by the labels or pallets to be applied with glue. In this manner, on the one hand, the used amount of glue is reduced and on the other hand, the maintenance effort of the gluing device is reduced. In particular, it may be dispensed with a complex return flow of surplus glue. In addition, the design of the glue roller and the glue-application unit allows a fast product change and a simple change between operation mode and idle mode of the labelling apparatus.

The invention claimed is:

1. A labelling apparatus for applying labels to containers, comprising:
    a gluing device having a glue roller; and
    a glue-application unit assigned to the glue roller and configured to apply glue to the glue roller, wherein the glue-application unit has at least one accommodating space for accommodating the glue;
    wherein the glue roller and/or the glue-application unit are designed and arranged in relation to one another such that glue in the accommodating space is applied to a surface of the glue roller only in one or more sub-regions of an overall extent in an axial direction of the glue roller, and
    wherein the glue-application unit on a side of the glue roller comprises at least one controllable scraper by means of which the at least one accommodating space is sealable on the side of the glue roller.

2. The labelling apparatus according to claim 1, wherein the glue roller comprises at least one contact segment axially corresponding to one or more sub-regions configured to accommodate glue in one or more recesses radially receding vis-à-vis a shell surface of the glue roller in contact with the glue-application unit.

3. The labelling apparatus according to claim 2, wherein the at least one contact segment only extends over a part of a circumference of the shell surface of the glue roller.

4. The labelling apparatus according to claim 2, wherein a surface of the glue roller outside at least one contact segment is smooth.

5. The labelling apparatus according to claim 2, wherein the one or more recesses are engraved or milled into the shell surface of the glue roller as gaps of a structure of the shell surface of the glue roller in a form of a grid, a perforated sheet, a fabric, or a combination thereof.

6. The labelling apparatus according to claim 2, wherein the glue roller comprises a base roller configured such that at least one surface element of the glue roller is mounted interchangeably to the base roller.

7. The labeling apparatus according to claim 6, wherein the at least one surface element is configured such that it comprises at least one contact segment.

8. The labelling apparatus according to claim 1, wherein the glue-application unit comprises two or more accommodating spaces spatially separated in the axial direction of the glue roller.

9. The labelling apparatus according to claim 1, wherein the scraper comprises two or more individually controllable segments which are assigned to different regions of the accommodating space in the axial direction of the glue roller.

10. The labelling apparatus according to claim 9, wherein the different regions of the accommodating space are separated from one another by one or more separating elements.

11. The labelling apparatus according to claim 1, wherein the glue-application unit comprises at least one first wall element and a second wall element and wherein the first and second wall elements limit the accommodating space in a circumferential direction of the glue roller.

12. The labelling apparatus according to claim 11, wherein the first wall element and/or the second wall element contacts the glue roller in operation and is resiliently pressed on the surface of the glue roller.

13. The labelling apparatus according to claim 1, further comprising at least one sealing unit sealing the accommodating space on at least one side, wherein the sealing unit is positioned in the axial direction of the glue roller on a side positioned in the gravity direction.

14. The labelling apparatus according to claim 1, wherein the glue-application unit is pivotedly mounted on a carrier.

15. The labelling apparatus according to claim 1, wherein the glue-application unit is movably configured in the axial direction of the glue roller.

* * * * *